UNITED STATES PATENT OFFICE.

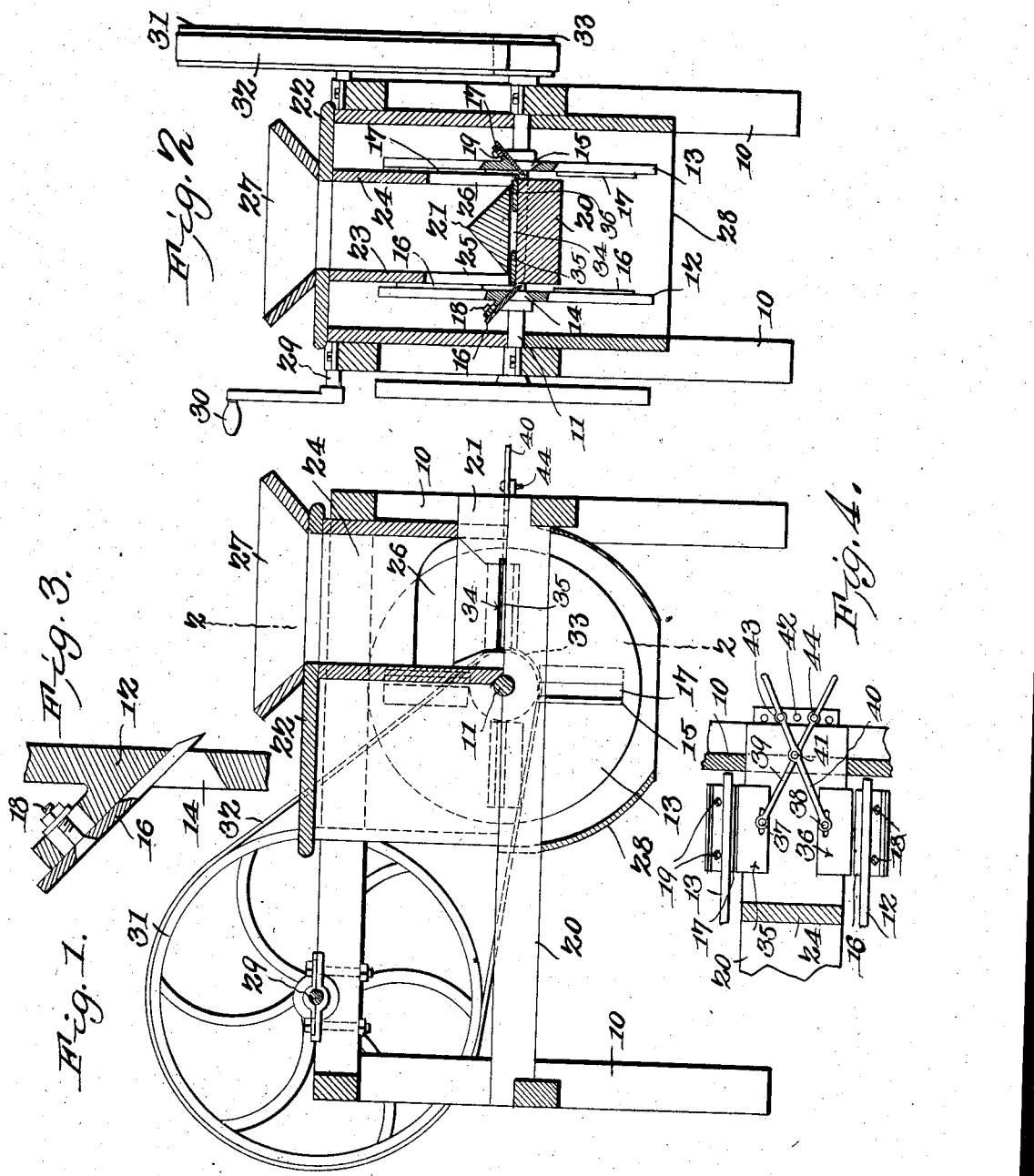

DANIEL B. HUFFMAN, OF WHITE, IDAHO.

KRAUT-CUTTER.

No. 834,982.  Specification of Letters Patent.  Patented Nov. 6, 1906.

Application filed March 17, 1906. Serial No. 306,663.

*To all whom it may concern:*

Be it known that I, DANIEL B. HUFFMAN, a citizen of the United States, residing at White, in the county of Kootenai and State of Idaho, have invented a new and useful Kraut-Cutter, of which the following is a specification.

This invention relates to vegetable-cutters, more particularly to devices of this class employed for reducing cabbage and like vegetables in the manufacture of kraut, and has for its object to improve the construction and increase the efficiency of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the perferred form of the embodiment of the invention capable of carrying the same into practical operation.

Figure 1 is a longitudinal vertical section. Fig. 2 is a transverse section on the line 2 2 of Fig. 1. Fig. 3 is a sectional detail of a portion of one of the disks and one of the cutters. Fig. 4 is a detail in section on the line 4 4 of Fig. 1 with the conical feed-block removed.

The improved device comprises a supporting-frame 10, having a transversely-disposed shaft 11, with disks 12 13 spaced apart thereon. The disks are provided with radial apertures 14 15, in which cutter-knives 16 17 are adjustably supported by clamp-bolts 18 19, the cutting edges of the knives projecting inwardly or toward each other.

Supported upon the frame 10 and extending between the disks 12 13 is a base member 20, upon which a conical guide or feed block 21 is supported between the disks and at one side of the shaft 11 or so disposed that the cutter-blades pass the lower outer sides of the guide-block in a substantially horizontal position.

The disks 16 17 are inclosed by a casing 22, having vertically spaced guard-plates 23 24, disposed relatively close to the inner faces of the disks 12 13 and with apertures 25 26 therethrough next the guide-block 21. The apertures thus form means of communication between the space between the guard members 23 24 and the cutting-knives, while the guard member 21 forms the bottom of the space into double-hopper form to cause the material to be pressed against the knives.

The casing 21 is provided with a feed-hopper 27, and depending from the casing 21 is a discharge-hopper 28 to convey the material from the cutters.

Mounted for rotation upon the frame 10 is a drive-shaft 29, having a crank 30 at one end and a drive-pulley 31 at the other end, the pulley adapted to operate the shaft 11 by a belt 32 and a smaller pulley 33.

The material to be reduced is fed through the hopper 27 into the space between the plates 23 24 and is caused to automatically pass through the apertures 25 26 and against the moving knives, where it is rapidly cut into thin slices and escapes through the hopper 28.

The mass of material in the feed-hopper causes a constant pressure of the material against the cutting-blades and requires no further attention from the operator after being placed in the hopper, and when the material is reduced in quantity to the last portion the inclined sides of the block 21 will cause these small particles to be also fed to the knives, so that nothing remains in the machine.

The shaft 11 may be driven by any power, and the machine may be constructed of any required size or capacity.

A transverse cavity 34 is formed between the conical guide member 21 and the base member 20, and slidably disposed within this cavity are gage-plates 35 36, adapted to be projected toward or away from the disks 12 13 to provide adjustable means for maintaining the cutting-blades in operative condition. The outer edges of the movable plates 35 36 may thus be disposed close to the cutting edges of the blades 16 17, no matter to what extent the latter may be adjusted.

The adjustable plates 35 36 are connected at 37 38 to levers 39 40, the latter coupled at 41, so that when the free ends of the levers are operated the plates 35 36 are simultaneously moved toward or away from the disks 12 13, as may be required.

The levers will be provided with means, such as spaced apertures 42 and pins 43 44, for holding the plates at any desired adjusted position.

Having thus described the invention, what is claimed is—

1. In a device of the class described, a supporting-frame including a longitudinally-extending bed member, a shaft mounted transversely of said frame and of said bed member, disks spaced apart upon said shaft and at opposite sides of said bed member and provided with radially-disposed cutters, a receptacle carried by said frame and with its side walls between said disks and with feed-apertures therein, a reversely-inclined bottom member within said receptacle and bearing upon said bed member and with lateral cavities between the bed member and bottom member, gage-plates slidable in said cavities, and means for adjusting said gage-plates relative to said cutters.

2. In a device of the class described, disks mounted for rotation and spaced apart and each provided with radially-disposed cutters, means for adjusting said cutters transversely of the disks, a receptacle having a reversely-inclined bottom and disposed between said disks and with feed-apertures communicating with the same, gage-plates movably disposed relative to said cutters and controlling the action thereof, levers intermediately coupled and pivoted at one end to said plates, and means for locking said levers in any required position.

In testimony that I claim the foregoing as my own I have hereto affixed my signature in the presence of two witnesses.

DANIEL B. HUFFMAN.

Witnesses:
   SIDNEY W. ROGERS,
   S. L. KECK.